Patented Jan. 26, 1937

2,068,782

UNITED STATES PATENT OFFICE 2,068,782

PLASTIC FOR LAMINATED SAFETY GLASS

George B. Watkins and Joseph D. Ryan, Toledo, Ohio, assignors to Libbey-Owens-Ford Glass Company, Toledo, Ohio, a corporation of Ohio No Drawing. Application June 26, 1934, Serial No. 732,870

5 Claims. (Cl. 49—92)

The present invention relates to the art of laminated safety glass manufacture and more particularly to an improved transparent plastic material which can be satisfactorily bonded to glass.

Laminated safety glass is a composited structure ordinarily composed of two sheets of glass with an interposed layer of plastic material adherent to the inner surfaces of the glass sheets. The quality and life of the laminated safety glass is dependent to a considerable degree upon the character of the plastic layer employed.

Heretofore, it has been generally customary to use a cellulose derivative plastic such as pyroxylin plastic and cellulose acetate plastic as the central layer, although attempts have been made to use a synthetic resin in lieu thereof.

In the main, the cellulosic plastics are desirable because they possess a relatively high tensile strength and can be bonded well to glass. On the other hand, some of the synthetic resins have desirable elastic or rubbery properties but lack the necessary tensile strength and adherence toward glass to give the proper characteristics to safety glass.

Much work has been done in the art to develop a plastic material of requisite tensile strength, sufficient elasticity, together with stability toward heat and light energy, which can be bonded to glass surfaces.

It has long been recognized that it is possible by increasing the plasticizer content in cellulosic derivative plastics to obtain a more flexible plastic, but the flexibility is naturally limited to the degree of plasticization and even with an extremely high plasticizer content the cellulose derivative sheet does not have the same elastic properties possessed by some of the synthetic resins, particularly the acrylic acid ester resins and the vinyl ester resins.

Broadly speaking, our invention resides in producing a plastic by mixing an organic cellulose derivative and an ester of unsaturated organic compounds. This involves more than the mere mixing of the organic cellulose derivative with the customary polymerized resins for, in fact, all attempts to obtain a plastic combining the desirable characteristics of the cellulosic plastic and the synthetic resins by incorporating varying percents of polymerized resins directly into the organic cellulose derivative plastic failed, even though both the resin and the organic cellulose derivatives can be dispersed or dissolved in the same solvents. The incompatibility of the organic cellulose derivatives and resins is well known and when solutions of the two, even though made with the same solvents, were mixed, invariably either the resin or the organic cellulose derivative is thrown out of solution by precipitation.

Many attempts were made to combine the two materials in this way, all without success. We then found that by starting with simple esters of unsaturated organic compounds or mixtures thereof capable of being polymerized, such as for example the vinyl or acrylic acid esters, it is possible to dissolve or disperse organic cellulose derivatives therein. After producing a solution in this way, namely, a solution of organic cellulose derivative and ester of unsaturated organic compounds, such as vinyl acetate, methyl and ethyl acrylate or mixtures thereof, the solution is subjected to any of the well known methods to bring about polymerization of the vinyl or acrylic acid ester compounds. Of course the degree of polymerization can be arrested at that point where the resulting plastic mass is of the right consistency for safety glass manufacture; or, if desirable, the plastic mass, consisting of the organic cellulose derivative and resin, can be plasticized by the addition of proper plasticizers which will depend somewhat upon the type of organic cellulose derivative and resin used in the preparation of the plastic.

As examples of how our improved plastic can be produced, we give the following:

(1) Dissolve the desired amount of ethyl cellulose in unpolymerized vinyl acetate or a mixture of vinyl acetate and vinyl chloride. Then, if it is desired to plasticize this mass, such plasticizers as dimethyl phthalate are added and the polymerization of the unsaturated organic ester carried out. If it is desired to use mixtures of vinyl acetate and vinyl chloride, the latter being a gas at normal temperatures, the solution of the cellulose derivative and copolymerization of the unsaturated compounds is suitably carried out in a closed gas-tight vessel into which the vinyl chloride is introduced under pressure after solution of the cellulose derivative in the vinyl acetate.

(2) Approximately 50 parts by weight of cellulose triacetobutyrate is dissolved in an equal part of unpolymerized vinyl acetate or a mixture of unpolymerized vinyl acetate and vinyl chloride with or without plasticizer, such as dibutyl phthalate, diethyl phthalate, or dimethyl phthalate. Also, we found that the solution of the organic cellulose derivative can be facilitated by the addition of a mutual solvent for the cellulose derivative and the unpolymerized, unsaturated organic ester.

In the case of the two examples given above, acetone works very satisfactorily. After solution of the organic cellulose derivative and before polymerization, the acetone can be removed by distillation and the polymerization continued in the usual manner.

(3) Dissolve or disperse ethyl cellulose in a mixture of unpolymerized methyl and ethyl acrylate to give a clear homogeneous solution. The ratio between the organic cellulose derivative and the polymerizable material will determine to a large extent the necessity for adding a mutual solvent such as acetone to facilitate the colloidalization of the mass preliminary to the final polymerization of the resin to give the transparent plastic material.

By following our invention, it is possible to prepare a transparent cellulosic resinous plastic, the properties of which can be varied from rather soft elastic material by increasing the resin content to a more rigid plastic having a fairly high tensile strength by increasing the ratio of the cellulose derivative.

In addition to these advantages, the resulting plastic material is exceedingly clear, can be well bonded to glass surfaces, is very light resistant and further, because of the presence of the resinous material thoroughly incorporated, the plastic is sufficiently water resistant to ordinarily permit of its use in safety glass manufacture without the use of an edge sealing compound.

As stated above, the ratio of the organic cellulose derivative to the resinous material can be varied in wide limits depending upon the properties of the plastic desired, and we have found that the addition of as little as two or three percent of the resin material greatly changes the characteristics of the resulting plastic over a straight organic cellulose derivative plastic sheet.

The compositing of our improved plastic and glass can be carried on in a number of different ways. In some instances, it may be preferred to make a preformed sheet which can be bonded directly to the glass sheets upon the application of heat and pressure. We have found that the use of adhesives or other bond inducing mediums heretofore employed in the art are not ordinarily required although obviously such adhesives can be used if preferred.

Depending somewhat upon the amount of resinous material included in the plastic, the plastic may be flowed upon one sheet of glass and the second sheet of glass subsequently placed upon the exposed surface of the plastic, or the glass sheets may be disposed in spaced relation and the plastic mass forced under pressure between the glass sheets.

In all cases it is preferable to elevate the temperature of the plastic mass during the bonding operation to facilitate working of the plastic including proper molding thereof to the glass surfaces and to give the requisite adhesion.

We claim:

1. As a new article of manufacture, a sheet of laminated safety glass comprising two sheets of glass and an interposed plastic layer formed by dispersing an organic cellulose derivative in an unpolymerized, unsaturated organic ester and then polymerizing said ester after complete mixing.

2. As a new article of manufacture, a sheet of laminated safety glass comprising two sheets of glass and an interposed layer of plastic material formed from a mixture of an organic cellulose derivative and a polymerized ester of an unsaturated organic compound polymerized in the presence of the said organic cellulose derivative.

3. As a new article of manufacture, a sheet of laminated safety glass comprising two sheets of glass and an interposed layer of plastic material formed from a mixture of an organic cellulose derivative and a polymerized ester of an unsaturated organic compound made by dissolving or dispersing the cellulose derivative in the unpolymerized ester of the unsaturated compound and then polymerizing the ester in the presence of the organic cellulose derivative solution or mixture.

4. As a new article of manufacture, a sheet of laminated safety glass comprising two sheets of glass and an interposed layer of plastic material formed from a plasticized mixture of an organic cellulose derivative and a polymerized ester of an unsaturated organic compound polymerized in the presence of the said organic cellulose derivative.

5. A laminated plate consisting of a pair of glass sheets with an interposed reinforcing layer of an organic cellulose derivative including one of the lower aliphatic esters of acrylic acid which has been polymerized in the organic cellulose derivative in solution.

GEORGE B. WATKINS.
JOSEPH D. RYAN.